US012084534B2

(12) United States Patent
Aguilar Bolados et al.

(10) Patent No.: US 12,084,534 B2
(45) Date of Patent: Sep. 10, 2024

(54) HIGHLY ELECTRICAL CONDUCTIVE COMPOSITE MATERIAL BASED ON GRAPHENE-LITHIUM POLYCARBOXYLATE-NANOPARTICLES

(71) Applicant: UNIVERSIDAD DE CHILE, Santiago (CL)

(72) Inventors: Héctor Esteban Aguilar Bolados, Santiago (CL); Mehrdad Yazdani-Pedram Zobeiri, Santiago (CL); Moises de Jesus Gallegos Cofre, Santiago (CL)

(73) Assignee: UNIVERSIDAD DE CHILE, Santiago (CL)

( * ) Notice: Subject to any disclaimer, the term of this patent is extended or adjusted under 35 U.S.C. 154(b) by 136 days.

(21) Appl. No.: 17/920,726

(22) PCT Filed: Apr. 23, 2020

(86) PCT No.: PCT/IB2020/053864
§ 371 (c)(1),
(2) Date: Oct. 21, 2022

(87) PCT Pub. No.: WO2021/214524
PCT Pub. Date: Oct. 28, 2021

(65) Prior Publication Data
US 2023/0167220 A1 Jun. 1, 2023

(51) Int. Cl.
*C08F 292/00* (2006.01)
*C01B 32/194* (2017.01)
(Continued)

(52) U.S. Cl.
CPC .......... *C08F 292/00* (2013.01); *C01B 32/194* (2017.08); *C01B 32/198* (2017.08);
(Continued)

(58) Field of Classification Search
CPC ........................... C08F 2810/00; C08F 292/00
See application file for complete search history.

(56) References Cited

U.S. PATENT DOCUMENTS

| 8,795,899 B2 | 8/2014 | Global |
| 2012/0116094 A1* | 5/2012 | Swager .................... C07F 5/00 562/466 |

FOREIGN PATENT DOCUMENTS

WO 2009/143405 A2 11/2009

OTHER PUBLICATIONS

Yazdani-Pedram, et al. "Mechanical and Thermal Properties of Multiwalled Carbon Nanotube/Polypropylene Composites Using Itaconic Acid as Compatibilizer and Coupling Agent". Macromolecular Research, vol. 21, No. 2, pp. 153-160 (2013).

(Continued)

*Primary Examiner* — Khanh T Nguyen
(74) *Attorney, Agent, or Firm* — Procopio, Cory, Hargreaves & Savitch LLP

(57) ABSTRACT

Herein presented is a high electrical conductivity, uniform, material based on nanoparticles-$Li^+$-polycarboxylate grafted few-layer graphene oxide including perovskite type nanoparticles for filler in polymeric matrices, in direct and reverse osmosis membranes, in lithium batteries, among others. The material is obtained by a method comprising the step of: preparation of a composite material having polymers with mono- or di-acid groups covalently bonded to graphene; optionally further comprising the preparation of a composite material with graphene covalently bonded to polymers having mono- or di-acid groups that have been replaced by lithium ion; and optionally further comprising the preparation of a composite material with graphene covalently bonded to polymers having mono- or di-acid groups that have been replaced by lithium ion in addition to (Continued)

grafted nanoparticles, including nanoparticles perovskite type.

24 Claims, 4 Drawing Sheets

(51) Int. Cl.
  *C01B 32/198* (2017.01)
  *C08K 9/06* (2006.01)
  *H01M 50/42* (2021.01)
(52) U.S. Cl.
  CPC ............ *C08K 9/06* (2013.01); *C01B 2204/22* (2013.01); *C01P 2004/04* (2013.01); *C01P 2004/64* (2013.01); *C08F 2810/00* (2013.01); *C08K 2201/011* (2013.01); *H01M 50/42* (2021.01)

(56) References Cited

OTHER PUBLICATIONS

Moncada, et al. "Use of PP Grafted with Itaconic Acid as a New Compatibilizer for PP/Clay Nanocomposites". Macromol. Chem. Phys. 2006, 207, 1376-1386.
Botas, et al. "Graphene materials with different structures prepared from the same graphite by the Hummers and Brodie methods". Carbon 65 (2013) 156-164.
Botas, et al. "Critical temperatures in the synthesis of graphene-like materials by thermal exfoliation-reduction of graphite oxide". Carbon 52 (2013) 476-485.
Aguilar-Bolados, et al. "Synthesis of fluorinated graphene oxide by using an easy one-pot deoxyfluorination reaction". Journal of Colloid and Interface Science 524 (2018) 219-226.
Aguilar-Bolados, et al. "Facile and Scalable One-Step Method for Amination of Graphene Using Leuckart Reaction". Chem. Mater. 2017, 29, 6698-6705.
Aguilar-Bolados, et al. "Effect of the morphology of thermally reduced graphite oxide on the mechanical and electrical properties of natural rubber nanocomposites". Composites Part B 87 (2016) 350-356.
Au, H. et al. Brominated graphene as a versatile precursor for multifunctional grafting. Chem. Sci., 2018,9, 209-217. multifunctional grafting. Chem. Sci., 2018,9, 209-217.
Eskandari, P. et al. Polymer grafting on graphene layers by controlled radical polymerization. Advances in Colloid and Interface Science, vol. 273, Nov. 2019, 102021.DOI: 10.1016/j.cis.2019.102021.
Layek, R. K. & Nandi, A. K. A review on synthesis and properties of polymer functionalized Graphene. Polymer. Volume 54, Issue 19, Aug. 23, 2013, pp. 5087-5103. DOI: 10.1016/j.polymer.2013.06.027.
Ruz, C. Preparación y Caracterización De Nanocompositos En Base De SEBS y Nanopartículas De BaTi03, SrTi03 Y (BaTi03)—(SrTi03). Memoria Para Optar Al Titulo Profesional De Quimico. Universidad De Chile Facultad De Ciencias Quimicas y Farmaceuticas, Departamento De Quimica Organica y Fisicoquimica. Santiago, Chile 2018. [Recuperado el Aug. 16, 2020]. Recuperado desde http://repositorio.uchile.cl/bitstream/handle/2250/169827/Preparacion-y-caracterizacion-de-nanocompositos-en-base-de-Sebs-y-nanoparticulas.pdf?sequence= 1 &isAllowed=y.
International Search Report for International application No. PCT/IB2020/053864. Dated Sep. 17, 2020. 3 pages.

\* cited by examiner

HIGHLY ELECTRICAL CONDUCTIVE COMPOSITE MATERIAL BASED ON GRAPHENE-LITHIUM POLYCARBOXYLATE-NANOPARTICLES

FIELD OF THE INVENTION

The present invention relates generally to the field of composite conductive materials, and in particular to uniform composite materials with high electrical conductivity, based on graphene-lithium polycarboxylate material, including nanoparticle-type material; to such materials use as filler in polymeric matrices, in membranes of direct and reverse osmosis, in lithium batteries, among other industrial applications. The material is obtained by a method comprising: preparation of a composite material having polymers with mono-or-di acid groups covalently bound to few-layer graphene oxide; optionally further comprising the preparation of a composite material with graphene covalently bound to polymers having mono- or di-acid groups which have been replaced by lithium ion; and optionally further comprising the preparation of a composite material with graphene covalently bound to polymers having mono- or di-acid groups that have been replaced by lithium ion in addition to grafted nanoparticles including perovskite type nanoparticles.

BACKGROUND OF THE INVENTION

Since the discovery of graphene in 2004, different studies have been carried out seeking to use it in polymeric matrices in order to improve their electrical, mechanical and thermal properties. In the literature, is possible to find methods that describe both its synthesis and its functionalization in order to improve the performance of a wide range of polymeric matrices, such as elastomeric, thermoplastic and thermosetting resins. The results obtained depend on the concentration filled, degree of dispersion, aspect ratio, functional groups and affinity with the polymer matrix selected.

The interest that graphene has aroused in various scientific and technological areas is due to its excellent thermal, mechanical, electrical and morphological properties. This material is a carbon polymorph in which the carbon atoms are bound exclusively by $sp^2$ bonds, which allows the atoms to have a long-range hexagonal arrangement, of monoatomic thickness and conjugated π bonds. It has been reported that this material has a load mobility at room temperature of 200,000 $cm2V^{-1}s^{-1}$ and high thermal conductivity between 2,000 $Wm^{-1}K^{-1}$ and 4,000 $Wm^{-1}K^{-1}$.

Despite the excellent properties of graphene, the challenges of developing large-scale production methods have limited its technological use. In addition, this material is highly nonpolar, therefore it has limitations with polar polymeric matrices. The synthesis methods proposed in the literature cover different strategies such as graphite exfoliation layer by layer, chemical vapor deposition and chemical or thermal reduction of graphite oxide, among others. This is why the quality and properties of these "graphene materials" can vary depending on the route of synthesis.

In the literature, it is recommended to refer to graphene material only when the number of stacked layers does not exceed 10. On the other hand, the functional groups present in graphene are relatively inert, so establishing covalent interactions of this material with polymeric matrices or other materials such as ceramics has been limited. Graphene functionalization has been focused from various perspectives, non-covalent functionalization, which mainly refers to the use of surfactants and covalent functionalization, such as silanization oxidation, fluoridation, among others. However, these are not always effective and low percentages of functional groups are achieved. Furthermore, the presence of specific functional groups, such as bromine, chlorine or alkoxyamine, on the surface of graphene materials may promote the occurrence of a controlled polymerization initiated on the surface of the graphene material.

Regarding the documents of the prior art related to this invention, it is possible to mention the CN107394207A patent (Ningbo Morsh Tech Co Ltd) which refers to a conductive powder compound comprising graphene and a macromolecule composite material formed and obtained, on the surface of the conductive carbon material, such as an in situ polymerization of monomers; the graphene material is closely combined with the macromolecule composite material through the conjugated action π-π between the graphene material and the macromolecule conducting compound. The conductive macromolecule compound is at least one of polyaniline, polypyrrole and polythiophene. The mass ratio of graphene material to the conductive carbon material in the polymer composite is 1:(0.1 to 10). The conductive carbon material is at least one of carbon nanotubes, carbon fibers and conductive carbon black. The method for preparing a conductive powder made of graphene involves: (1) dissolving a conductive carbon material and a monomer, an initiator and a dopant in an aqueous solution and mixing uniformly, by in-situ polymerization; obtaining a polymeric composite material by reaction, in which the monomer is at least one of aniline, pyrrole and thiophene; (2) dispersing the polymeric composite material and the graphene material in water separately, mixing uniformly, through conjugated π-π to obtain a conductive compound composed of graphene; (3) dry the graphene compound conductive paste to obtain a graphene compound conductive powder. The initiator is at least one of ferric chloride, ammonium persulfate and potassium persulfate. The dopant is at least one of hydrochloric acid, $H_2SO_4$ and sodium dodecylbenzenesulfonate. Additionally, in step (2), a gas generating agent selected from ammonium carbonate or ammonium hydrogen carbonate is added, at least one being ammonia water, ammonium sulfate, ammonium sulphite, ammonium oxalate and oxalic acid. The mass ratio of the gas generating agent to the graphene material is 1:(1 to 20).

U.S. Pat. No. 9,359,208B2 (Global Graphene Group Inc) refers to a process for producing a highly conductive graphite film, comprising: (a) mixing graphene platelets with a carbon precursor polymer and a liquid to form a suspension and then convert the suspension into a film wet under the influence of an orientation inducing voltage field to align the graphene platelets on a solid substrate; (b) removing the liquid to form a precursor polymer composite film in which graphene platelets occupy a weight fraction of 1% to 99%; (c) carbonize the precursor polymer composite film at a carbonization temperature of at least 300° C. to obtain a carbonized composite film; and (d) heat treating the carbonized composite film at a final graphitization temperature greater than 1500° C. to obtain the graphite film. Preferably, the carbon precursor polymer is selected from the group consisting of polyimide, polyamide, polyoxadiazole, polybenzoxazole, polybenzobisoxazole, polythiazole, polybenzothiazole, polybenzobistiazole, poly (p-phenylene vinyl), polybenzimidazole, polybenzobisbisidide, alcohol alcohol, phenylbisfuride polyacrylonitrile alcohol and combinations thereof.

US20130288126A1 (California University) describes a family of carboxylic acid groups containing fluorene/fluorenon copolymers as silicon particle binders in the manufacture of negative electrodes for use with lithium-ion batteries. Triethylene oxide side chains provide improved adhesion to materials such as graphite, silicon, silicon alloy, tin, tin alloy. These binders allow the use of silicon as an electrode material, since they will improve the capacity of the silicon cycle by preventing the degradation of the electrode over time. In particular, these polymers, which become conductors in the first charge, bind to the silicon particles of the electrode, are flexible to accommodate better the expansion and contraction of the electrode during charge/discharge, and being conductors promote the current of the flow battery.

CN103346024A (Univ Changzhou; Changzhou JPU Qualtec Co Ltd) provides a method to prepare a high conductivity flexible graphene membrane electrode that overcomes the problems of cracking and insufficient degree of folding, comprising: using the Hummers method, preparing a liquid Graphite oxide dispersant by adding simultaneously electrically conductive carbon material and high polymer, dispersing evenly through ultrasonic vibration, a graphite oxide film is formed, then a high conductivity flexible graphene film is reduced and prepared, having an electrical conductivity of 200-1000 S/cm, electrochemical capacity of 190 F/g, thickness of 120-300 microns. The film can be adapted to have different shapes and thicknesses. The conductive carbon material is activated carbon, BP-2000 carbon black, acetylene black, and carbon fiber, graphite or carbon nanotubes, being the mass ratio 0.2 to 20% by weight in the graphene film. The high polymer is epoxy resin, polyethylene terephthalate or polyimide, being the mass ratio of the polymer in the graphene film 0.1 to 10% by weight. The method to form graphite oxide is vacuum filtration or spray coating. The reduction of graphite oxide is carried out by a method of thermal reduction of hydrogen or a method of reduction of HI solution.

WO2015004621A1 (Grafoid Inc; Inst Rech in Électricité D Hydro Québec Ireq; Chiu Gordon) provides an active material comprising graphene-fibrous carbon compound and its manufacture. The material is uniform and conductive, and includes graphene or graphene nanoporous and fibrous carbon, preferably vapor-grown carbon fibers (VGCF) and optionally a lithium metal phosphate (LMP), preferably lithium phosphate or manganese phosphate of lithium.

U.S. Pat. No. 9,786,407B1 (Council on Postsecondary Education) refers to a method to provide a significant improvement in the electrical conductivity of a graphene/polymer composite by adding a non-conductive charge to the insulating polymer that acts as a hardening and dispersing-aid agent, which comprises: dissolving a polymer in a solvent; making a suspension comprising the dissolved polymer and a non-conductive filler dispersing agent; make a suspension comprising individual graphene units; mixing the two suspensions together; add an antisolvent for the polymer to the mixed suspension to precipitate a composite material; dry the composite material; and pressing the composite material to remove the air and produce the desired shape, wherein the non-conductive filler dispersion aid comprises silica or a core-coated rubber and wherein the non-conductive filler dispersion-aid is present in the range 5-10 percent by volume, and graphene units are present in the range of 1.5-2.5 percent by volume. The polymer is polystyrene. The solvent is N, N-dimethylformamide. The antisolvent is methanol. Graphene units comprise graphene nanoplates. The core-cover rubber has a rubber core and a polymer cover, and the rubber is polybutadiene. The polymer shell is a methyl methacrylate/styrene/acrylate copolymer. In addition, the steps to make the suspensions include sonicating the suspensions to disperse the non-conductive graphene and filling units within their respective suspensions.

Then, although the prior art shows numerous conductive compositions, including some of improved properties, the need persists in numerous industrial activities of composite materials that have high conductivity, uniformity and low production cost.

This is why the development of a graphene of few layers, with reactive functional groups that allow even ion exchange and grafting with other materials such as inorganic nanoparticles, is of non-negligible interest. The perspectives of application of this material are very wide, from its use as filler in polymeric matrices, use in direct and reverse osmosis membranes, and use in lithium batteries. The present composite material has considerable advantages over others prepared by other synthetic routes.

SUMMARY OF THE INVENTION

Herein presented is a high electrical conductivity, uniform, material based on nanoparticles-$Li^+$-polycarboxylate grafted few-layer graphene oxide including perovskite type nanoparticles for filler in polymeric matrices, in direct and reverse osmosis membranes, in lithium batteries, among others. The material is obtained by a method comprising the step of: preparation of a composite material having polymers with mono- or di-acid groups covalently bonded to graphene; optionally further comprising the preparation of a composite material with graphene covalently bonded to polymers having mono- or di-acid groups that have been replaced by lithium ion; and optionally further comprising the preparation of a composite material with graphene covalently bonded to polymers having mono- or di-acid groups that have been replaced by lithium ion in addition to grafted nanoparticles, including nanoparticles perovskite type.

BRIEF DESCRIPTION OF THE DRAWINGS

FIG. 1 TEM image of the first composite material obtained in Example 1.

FIG. 3 TEM image of the second composite material obtained in Example 2.

FIG. 4 TEM image of the third composite material obtained in Example 3.

DETAILED DESCRIPTION OF THE INVENTION

The invention provides a method for preparing a material with high electrical conductivity based on graphene-lithium polycarboxylate nanoparticles including perovskite type nanoparticles; and use thereof as filler in polymeric matrices, in direct and reverse osmosis membranes, in lithium batteries, among other industrial applications.

Figure 1:
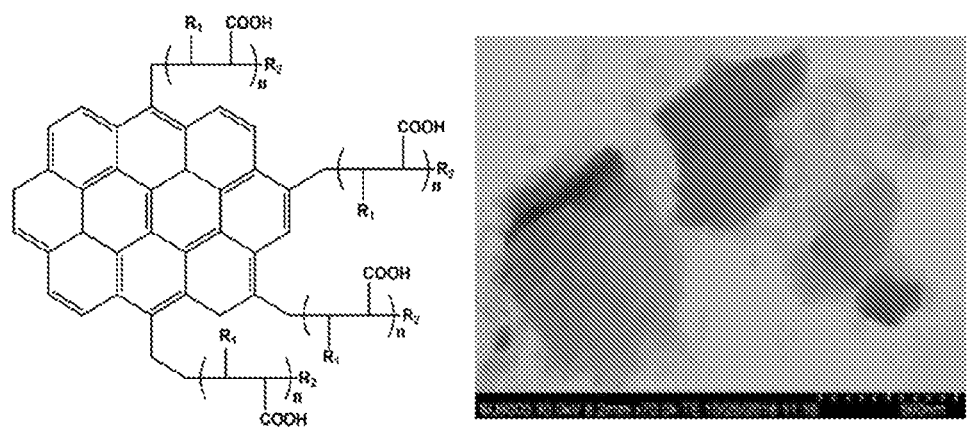
FIG. 1. Shows a molecular structure of the first composite material (1), $R_1$ is methyl, ethyl, propyl, isopropyl, isobutyl ester or butyl carboxylate, $R_2$ is chlorine or bromine, and n ranges from 1 to 300.
Figure 3:
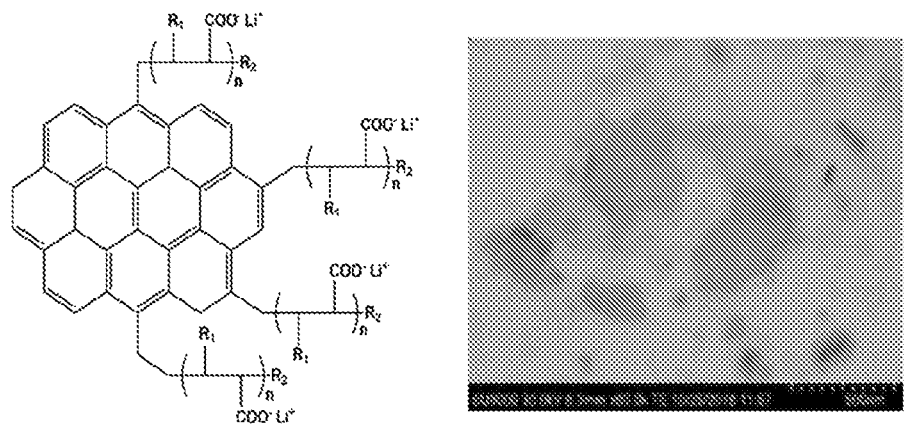
FIG. 3. Shows a molecular structure of the second composite material (2). $R_1$ is methyl, ethyl, propyl, isopropyl, isobutyl ester or butyl carboxylate, $R_2$ is chlorine or bromine, and n ranges from 1 to 300.
Figure 4:
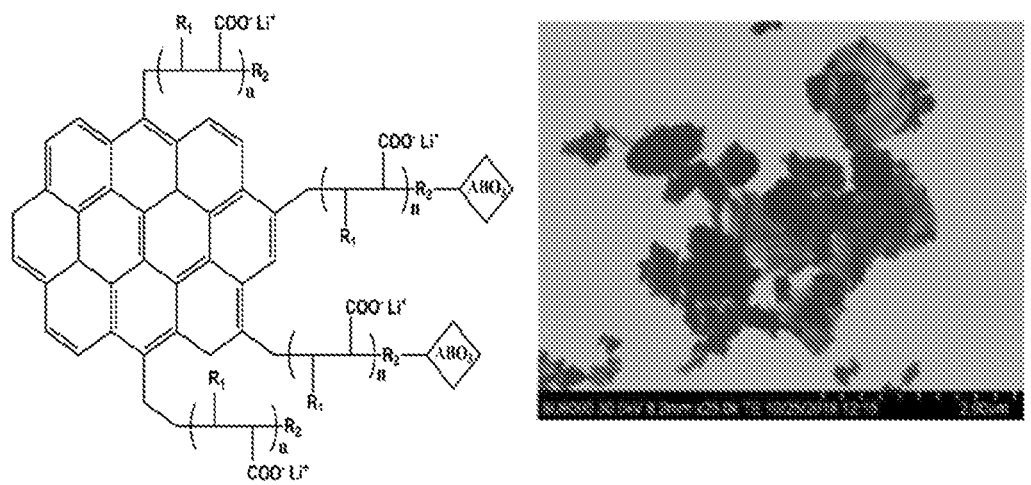
FIG. 4. Shows a molecular structure of the third composite material (3). $R_1$ is methyl, ethyl, propyl, isopropyl, isobutyl ester or butyl carboxylate, $R_2$ is chlorine or bromine, A is Ca(II), Mg(II), Sr(II) or Ba (II), B is Ti(III), V(III), Mn(III), Fe(III), Co(III) or Ni(III) and n ranges from 1 to 300.

It is an object of the present invention a material based on graphene-lithium polycarboxylate nanoparticles including perovskite type nanoparticles, preferably Material 1, Material 2 and Material 3, according to the Formula 1 (FIGS. 1, 3 and 4).

An additional object of this invention is a material obtained by a method which comprises the step of:
- preparation of a first compound with polymers having mono- or di-acid groups covalently bonded to graphene;
- optionally, further comprises the preparation of a second compound with graphene covalently bonded to polymers having mono- or di-acid groups that have been replaced by lithium ion; and
- optionally, further comprises preparation of a third composition with graphene covalently bonded to polymers having mono- or di-acid groups that have been replaced by lithium ion in addition to grafted nanoparticles including perovskite type nanoparticles.

Any of the obtained material of the present invention show great conductivity (FIG. 5) and can be widely used in applications for conductive composites and in the conductive field of polymer composites.

In a preferred embodiment of this invention, said material is obtained by the described method, preferably comprising the following steps:
- a) Synthesis of a first composite corresponding to a graphene functionalized with polymer chains having mono or di functionality of acid groups. These polymer chains are obtained by the controlled polymerization of monomer of the monoster or diester type derived from citraconic acid, mesaconic acid, itaconic acid or fumaric acid, are covalently linked to graphene oxide by a controlled radical polymerization reaction, including polymerization reactions atom transfer radical polimerization (ATRP), reversible addition-fragmentation chain-transfer polymerization (RAFT), iodine transfer polymerization (ITP) and TERP tellurium-mediated radical polymerization method, allowing optimal control of the formation of the radical species that allows the propagation in specific sites of the molecule, stimulating the control of the formation of polymer formed by the monoster or diester monomer derived from citraconic acid, mesaconic acid, itaconic acid, maleic acid or fumaric acid. These polymer chains are covalently linked to the graphene material at certain sites of structures or surfaces. These sites are characterized by being susceptible to reactions of esterification, silanization or nucleophilic substitution. Those that can be oxygenated groups such as ester, ketones, carboxylic acids, epoxy or alcohol. The first composite having 40% by weight of polymer with acid functional groups, wherein said first composite shows areas of greater electron density, that is, the darker areas, which indicates the presence of a material composed of few graphene layers, and where less shaded areas indicate the formation of polymer around these graphene layers. To obtain the polycarboxylate grafted few-layer graphene oxide, a reaction between brominated graphene oxide and monoster or diester derived from citraconic acid, mesaconic acid, itaconic acid, maleic acid or fumaric acid in the presence of citric acid, and CuBr (II) in relation (300-2000): 2500: (1-10): (1-20) in organic solvent medium was conducted. To this mixture was added bipyridine (bpy), tris[2-(dimethylamino)ethyl]amine (Me6TREN), tris(2-pyridylmethyl) amine (TPMA), 4,4'-Dinonyl-2,2'-dipyridyl (dNbpy) or N, N, N N ", N"—pentamethyldiethylenetriamine (PMDETA) and allowed to react between 3 and 48 hours, preferably 6 to 18 hours, more preferably 10 hours, the reaction temperature was set between 50° C. and 100° C., preferably 60° C. to 80° C., more preferably 70° C. This reaction was carried out under inert atmosphere. After the reaction time elapsed, the mixture was vaporized until the solvent was removed and then allowed to dry at 40° C.-120° C. for 15 hours. The solid obtained was added to a dialysis membrane of MWCO between 2.0 and 2.5 KDa and dialyzed in deionized water for 65 to 75 hours. Then the resulting material is allowed to dry at 45° C. to 55° C. for 6 to 18 hours.

In the literature, it is described that controlled radical polymerization reactions of monomers with acidic groups have limitations such as the reactivity of the monomer that is diminished by acceptor nature of the carboxylic acid groups. Therefore, the polymer it is not formed or has very low molecular weight. On the other hand, scientific evidence indicates that polymerization via free radicals of itaconic acid can be successful by deriving its carboxylic acid groups to esters. Experimentally, both the monoester and the diesters of citraconic acid, mesaconic acid, itaconic acid, maleic acid or fumaric acid are susceptible to polymerization via free radicals in bulk or solvent-free reactions, at temperatures around 80° C. (depending on of the half-life of the initiator), an inert atmosphere, using dicumyl peroxide, benzoyl peroxide, tert butyl peroxide or azobisisobutyronitrile, as initiators. This is why for the controlled radical polymerization initiated on the surface of graphene oxide; it was carried out using a monoester or diester of citraconic acid, mesaconic acid, itaconic acid, maleic acid or fumaric acid. The material obtained is subjected to a dialysis process using a membrane of between 2.0 and 2.5 KDa as a molecular weight cut-off (MWCO). This allows eliminating the monomer that has not reacted successfully. The inventors have previously used itaconic acid in polymers (E. Moncada, R. Quijada, I. Lieberwirth, M. Yazdani-Pedram, Use of PP grafted with itaconic acid as a new compatibilizer for PP/clay nanocomposites, Macromolecular Chemistry and Physics 207 (15) (2006) 1376-1386; M. Yazdani-Pedram, C. Menzel, P. Toro, R. Quijada, A. May-Pat, F. Aviles, Mechanical and thermal properties of multiwalled carbon nanotube/polypropylene composites using itaconic acid as compatibilizer and coupling agent, Macromolecular Research 21 (2) (2013) 153-160), without reporting controlled polymerization.
- b) Synthesis of a second composite corresponding to graphene functionalized with polymer chains having mono or di functionality of lithium carboxylate groups from the first composition corresponding to graphene functionalized with polymer chains having mono or di functionality of resulting acid groups of step a), which comprises replacing the acidic hydrogen atoms of the first compound, with lithium ions. Its preparation consists in dispersing functionalized graphene with polymer chains having mono or di functionality of acid groups in distilled water, leading to a 1-10 wt. % suspension. The suspension is subjected to continuous stirring and a solution of lithium hydroxide 0.1-5 M concentration is added dropwise. Until the basicity of suspension is reached (8<pH<11). The resulting suspension is allowed to dry at 40-120° C. for 10 to 15 hours.

c) Synthesis of a third composite corresponding to graphene functionalized with polymer chains having mono or di functionality of lithium carboxylate groups grafted with nanoparticles including perovskite type nanoparticles from grafting perovskite type nanoparticles ($ABO_3$ or functionalized $ABO_3$) into the corresponding second composite to graphene functionalized with polymer chains having mono or di functionality of lithium carboxylate groups by covalent bonds, being the weight ratio between the second composition corresponding to graphene functionalized with polymer chains having mono or di functionality of lithium carboxylate groups and nanoparticles including perovskite type nanoparticles, 1: (0.5 to 3). The synthesis of this hybrid graphene consists in the dispersion by agitation of functionalized graphene with lithium polycarboxylate in decalin, toluene, xylene, N,N-dimethyl formamide, N-methyl-2-pyrrolidone or dioxane. Once the graphene material is dispersed, an amount of inorganic nanoparticles including perovskite type nanoparticles functionalized with organosilanes with terminal primary amine groups is added to achieve a 1: (0.5 to 3) ratio of graphene and nanoparticles type material including perovskite type material. The mixture is subjected to an ultrasound treatment. Subsequently, the reaction is carried out under inert atmosphere at a temperature between 100° C. and 150° C. The reaction time is between 2 and 24 hours. The resulting material is separated and dried at 65 to 75° C. for 10 to 15 hours.

It is an object of the present invention a material based on graphene-lithium polycarboxylate nanoparticles including perovskite type nanoparticles as shown in FIGS. 1, 3 and 4, microscopy images of polycarboxylate grafted few-layer graphene oxide, $Li^+$-polycarboxylate grafted few-layer graphene oxide and $ABO_3$-$Li^+$-polycarboxylate grafed few-layer graphene oxide, where A is Ca(II), Mg(II), Sr(II) or Ba (II) and B is Ti(III), V(III), Mn(III), Fe(III), Co(III) or Ni(III). These images were obtained using a Hitachi high-resolution electron microscope; model S8000 with field-emission filament in TEM mode. For the preparation of the sample for TEM analysis, a drop of an aqueous dispersion of the added sample was added on a carbon grid and allowed to dry at room temperature. Graphene layers are the clearest ones that have the lowest electronic density.

Figure 2:
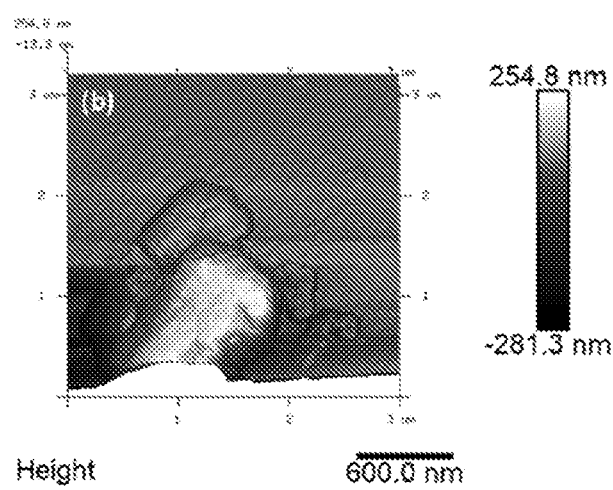
FIG. 2. Shows a three-dimensional atomic force microscopy of GO-first composite material.

In a preferred embodiment of the present invention FIG. 2 shows a 3D atomic force image of GO-first material. This image was obtained using an Atomic Force Microscope, Bruker®, model INNOVA SPM using Tapping mode was used for the analysis of polycarboxylate grafted few-layer graphene oxide. The images were obtained using a commercial silicon cantilever tip, with a resonant frequency of 300 KHz under air atmosphere and at room temperature. The tip used was RTESP nanoprobe from Bruker, with a spring constant of 40 Nm-1 and 8 nm tip radius. The scanning frequency was 0.3 Hz.

Figure 5:
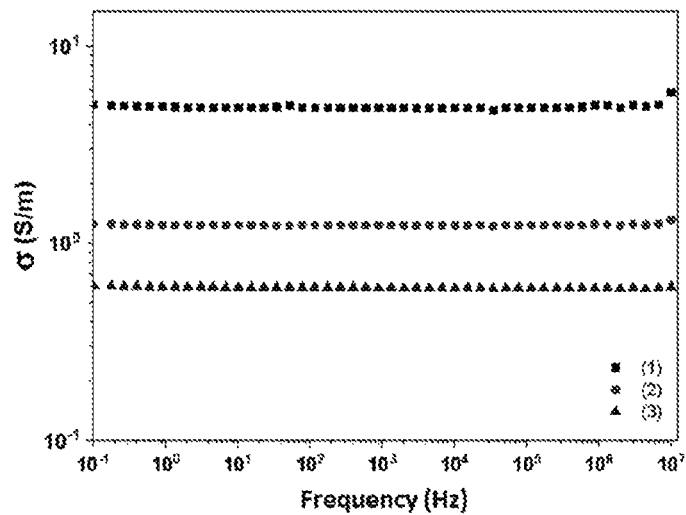
FIG. 5. Electrical conductivity of the first composite material (1), second composite material (2) and third composite material (3) as a function of the frequency of the electric field.

Any of the obtained material of the present invention show great conductivity as shown in FIG. 5 where the electrical conductivity of the first (1), second (2), and third (3) material is evidenced as a function of the frequency of the electric field.

As summary, the prior art does not describe the materials of the present invention nor the functionalization of graphene with polymer with carboxylate groups possessing lithium counter-ions by ion exchange of lithium ions and nanoparticles including perovskite type nanoparticles.

In addition to the above, in a preferred embodiment of this invention, $ABO_3$-$Li^+$-polycarboxylate grafed few-layer graphene oxide material is obtained by the described method, preferably comprising: condensation reaction between amine groups present in the nanoparticle including perovskite type nanoparticles and carboxylates present in the graphene-based material. In particular perovskite-type nanoparticles are not very reactive, which is why it is necessary to functionalize.

The following examples are provided to illustrate certain embodiments of the invention and they are not intended to limit the invention in any way.

EXAMPLES

Example 1: Preparation of the First Composite Material—Polymerization with Monomers with Acid Groups Polycarboxylate grafted few-layer graphene oxide is produced by conducting a reaction between brominated graphite oxide, monomethyl ester of citraconic acid, mesaconic acid, itaconic acid, maleic acid or fumaric acid, ascorbic acid, used as a reductant, and copper (II) bromide, catalyst precursor, in relation to (300 to 2000): (2000 to 3000: (0.5 to 10): (1 to 20), in organic solvent medium under an inert atmosphere and at a reaction temperature between 50° C. and 100° C. Subsequently, small portions of bipyridine (bpy), tris[2-(dimethylamino)ethyl]amine (Me6TREN), tris (2-pyridylmethyl)amine (TPMA), 4,4'-Dinonyl-2,2'-dipyridyl (dNbpy) or N, N, N N ", N"— pentamethyldiethylenetriamine (PMDETA) are added and allowed to react between 3 and 48 hours, depending on the amount of monomer to be polymerized. The first composite material (polycarboxylate grafted with graphene oxide) is washed successively with an organic solvent and subjected to a drying process at a temperature between 40° C. to 120° C. for 10 to 15 hours.

Subsequently, a process of purification of the solid obtained by dialysis with dialysis membranes of between 2.0 and 2.5 KDa of MWCO in ultra-purified water is performed. The dialysis time lasts between 2 and 48 hours, the dialysis membrane content is poured into a Petri dish and dried for 6 to 18 hours at temperature between 45° C. to 55° C.

Figure 6:
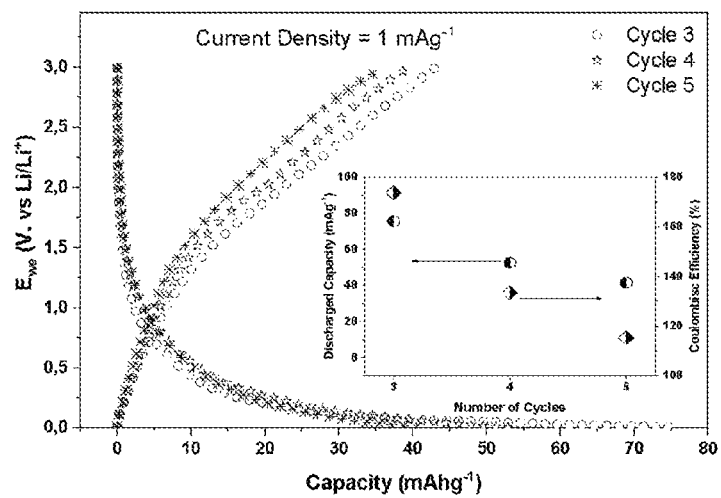
FIG. 6. Galvanostatic charge/discharge cycles of a lithium half-cell using polycarboxylate grafted few-layer graphene oxide (1) as electrode material.
Figure 7:
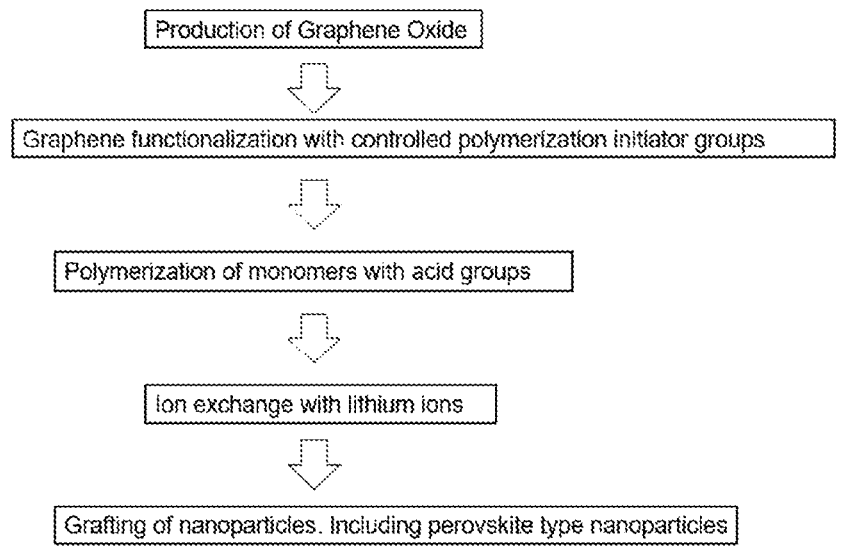
FIG. 7. Scheme comprising the steps of the method for obtaining these composite materials.

FIG. 6 shows galvanostatic charge/discharge cycles of a lithium half-cell using polycarboxylate grafted few-layer graphene oxide as electrode material (1). Capacity value of half-cell reaches up to 75 mAh/g at a current density of 1 mA/g. In spite of the coulombic efficiency seems to decrease as the number of cycles increases, a high lithium ion storage capacity into of polycarboxylate grafted few-layer graphene oxide the is evidenced. The half-cell containing metallic lithium was prepared using stainless steel symmetric Swagelok® cells. The assembly of half-cell was carried out into an Argon glove box ($H_2O$<5 ppm, 02<5 ppm), where in a preferred embodiment of the present invention polycarboxylate grafted few-layer graphene oxide was used as positive electrode, metal lithium as negative electrode and a porous glass fibre disc (Whatman®) used as a separator to avoid electric shortcut. The separator was previously impregnated with a commercial electrolyte solution with a concentration of 0.1 to 5 M of LiPF$_6$ salt in ethyl carbonate (EC) and dimethyl carbonate (DMC) mixture with a 1:(1 to 5) volume ratio (Sigma-Aldrich). The Li//electrolyte//polycarboxylate grafted few-layer graphene oxide cells were cycled in a VMP multichannel potentiostat/galvanostat (BioLogic) operating at constant current densities. The cells were cycled in a voltage range between 0.005 V and 3.0 V vs Li$^+$/Li. To lead stage a) graphene oxides were used, including those synthesized by the method reported by Hummers (C. Botas, P. Álvarez, C. Blanco, R. Santamaria, M. Granda, M D Gutiérrez, F. Rodríguez-Reinoso, R. Menéndez, Critical temperatures in the synthesis of graphene-like materials by thermal exfoliation—reduction of graphite oxide, Carbon 52 (0) (2013) 476-485; and C. Botas, P. Álvarez, P. Blanco, M. Granda, C. Blanco, R. Santamaría, LJ Romasanta, R. Verdejo, M A López-Manchado, R. Menéndez, Graphene materials with different structures prepared from the same graphite by the Hummers and Brodie methods, Carbon 65 (0) (2013) 156-164), preferably graphene oxide produced by Brodie's method since it has a better performance in its use as reinforcement in composites based on elastomers (H. Aguilar-Bolados, M A Lopez-Manchado, J. Brasero, F. Aviles, M. Yazdani-Pedram, Effect of the morphology of thermally reduced graphite oxide on the mechanical and electrical properties of natural rubber nanocomposites, Composites Part B: Engineering 87 (2016) 350-356), and proved to have greater reactivity which facilitates its functionalization (H. Aguilar-Bolados, D. Vargas-Astudillo, M. Yazdani-Pedram, G. Acosta-Villavicencio, P. Fuentealba, A. Contreras-Cid, R. Verdejo, M. A. López-Manchado, Facile and Scalable One-Step Method for Amination of Graphene Using Leuckart Reaction, Chemistry of Materials 29 (16) (2017) 6698-6705; H. Aguilar-Bolados, A. Contreras-Cid, M. Yazdani-Pedram, G. Acosta-Villavicencio, M. Flores, P. Fuentealba, A. Neira-Carrillo, R. Verdejo, M. A. López-Manchado, Synthesis of fluorinated graphene oxide by using an easy one-pot deoxyfluorination reaction, Journal of Colloid and Interface Science 524 (2018) 219-226).

Example 2: Preparation of the Second Composite Material/Ion Exchange with Lithium Ions The polycarboxylate grafted few-layer graphene oxide obtained according to Example 1 is dispersed in water, forming an aqueous suspension with a variable concentration between 1-10 wt. %, to which lithium hydroxide solution with concentration 0.1-5 M is added dropwise, recording the pH variations, until there is a sharp change in its value between 8 and 11. Finally, the dispersion in a hydro, alcohol or ketone medium is removed and the composite Li$^+$-polycarboxylate grafted few-layer graphene oxide is obtained.

Example 3: Preparation of the Third Composite Material/Graft of Nanoparticles Including Perovskite Type Nanoparticles The second composite material reacts with inorganic nanoparticles including perovskite type nanoparticles functionalized with organosilane compounds and containing reactive terminal amines. Both reagents in a 1: (0.5 to 3) ratio dispersed in decalin, toluene, xylene, N, N-dimethyl formamide, N-methyl-2-pyrrolidone or dioxane are sonicated. The reaction is carried out in an inert atmosphere and 4 Å molecular sieve is added as a drying agent in the reaction medium. The reaction temperature is between 100° C. and 150° C. and the reaction time is between 2 and 24 hours. The third composite material (graphene-grafted polycarboxylate with lithium ions and nanoparticles including perovskite type nanoparticles) is removed from the supernatants and then follows the drying process.

Example 4: Obtaining Graphene Oxide and Controlled Radical Polymerization Initiator Based on Graphene Oxide Functionalized with Bromine Groups To obtain graphene oxide to be used according to example 1, two stages are needed, the first stage comprises the oxidation of graphite by the method described by Brodie, where 5 g of graphite was added to a cooled reactor at 100 mL of nitric acid fuming at temperature between −5° C. and 0° C., then slowly add 20 to 60 g of potassium chlorate, and after a reaction time of 5 to 36 hours, the reactor contents are poured into 800 to 4000 mL of cold distilled water, then centrifuged and washed with plenty of water, to finally obtain a solid that is allowed to dry at 40° C. to 100° C. for 12 to 24 hours.

In the second stage, the above-mentioned solid is dispersed in a certain amount of graphene oxide in an organic solvent and is sonicated until a homogeneous suspension is obtained. Subsequently, aminopropyltriethylsiloxane (APTES) is added, in a ratio of 10% to 40% by mass relative to graphene oxide. The reactor is taken to an inert atmosphere and allowed to react at −5° C. to 10° C. for 1 to 24 hours. Once this time has elapsed, the temperature is taken to 50° C.-100° C. and allowed to react for 1 to 6 hours. The material obtained is silanized graphene oxide having primary amine terminal groups (—NH$_2$). The third stage for obtaining graphene used as a controlled radical polymerization initiator consists in dispersing a certain amount of silanized graphene oxide in dimethyl formamide and a certain amount of α-bromoisobutyryl bromine is injected. This dispersion is sonicated by the use of ultrasound. Subsequently, this suspension is added to a reactor and the temperature is taken to −5° C. to 10° C. under a nitrogen atmosphere. It is allowed to react between 1 and 6 hours. Once the reaction time has elapsed, the temperature is increased to 50° C.— 100° C. and allowed to react between 12 and 21 hours. The solid obtained is washed with abundant dimethylformamide, filtered and dried for 12 to 24 hours at 50° C. to 120° C.

The invention claimed is:

1. A graphene-polycarboxylate type material comprising the Formula (I):

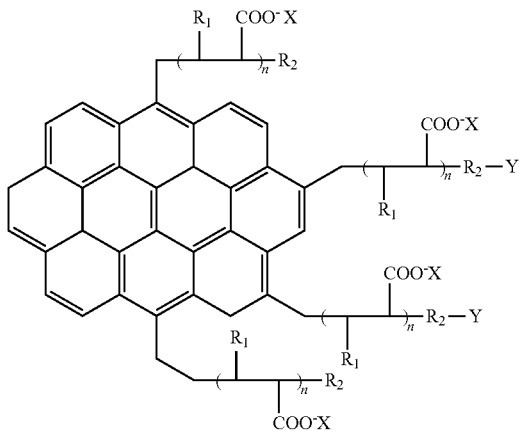

where,

X is $H^+$ or $Li^+$;

Y is $H^+$, $ABO_3$ or functionalized $ABO_3$;

$R_1$ is methyl, ethyl, propyl, isopropyl, isobutyl ester or butyl carboxylate;

$R_2$ is chlorine or bromine;

A is Ca(II), Mg(II), Sr(II) or Ba (II) and B is: Ti(III), V(III), Mn(III), Fe(III), Co(III) or Ni(III); and n: ranges from 1 to 300, wherein said material is uniform and conductive.

2. The material of claim 1, wherein said material is a graphene-polycarboxylate-nanoparticle type material.

3. The material of claim 2, wherein said nanoparticle is a perovskite type nanoparticle.

4. The material of claim 1, wherein said material is formed by a method comprising:
   a. reacting the graphene oxide with a monomer of mono- or di-ester in presence of nitric acid and CuBr(II) in an organic solvent;
   b. adding a polyamine to the mixture under inert atmosphere and evaporating the solvent after the reaction finishes.

5. The material of claim 4, wherein said method further comprises:
   c. mixing the functionalized graphene with distilled water to form a suspension;
   d. adding lithium hydroxide under continuous agitation until reaching pH 8 to 11 and the suspension is allowed to dry.

6. The material of claim 5, wherein said method further comprises:
   e. dispersing by agitation the functionalized of polycarboxylate grafted few-layer graphene oxide graphene with lithium polycarboxylate in decalin, toluene, xylene, N,N-dimethylformamide, N-methyl-2-pyrrolidone or dioxane,
   f. adding inorganic nanoparticles with functionalized organosilanes, in a ratio between 1: (0.5-3);
   g. treating the mixture with ultrasound under an inert atmosphere;
   h. removing and drying the resulting material.

7. The material of claim 6, wherein the reaction time in (f) is between 2-24 hours.

8. The material of claim 6, wherein the reaction temperature in (f) is between 100° C.-150° C.

9. The material of claim 6, wherein the drying time in (h) is between 10-15 hours.

10. The material of claim 6, wherein the drying temperature in (h) is between 65° C.-75° C.

11. The material of claim 5, wherein the organic solvent in (e) is selected from decalin, toluene, xylene, N,N-dimethylformamide and N-methyl-2-pyrrolidone.

12. The material of claim 5, wherein the concentration of the suspension in (c) is in a range between 1-10 wt %.

13. The material of claim 5, wherein the concentration of lithium hydroxide in (d) range between 0.1-5 M.

14. The material of claim 5, wherein the drying temperature in (d) is between 40° ° C.-120° ° C.

15. The material of claim 5, wherein the drying time in (d) is between 19-23 hours.

16. The material of claim 4, wherein the mono- or di- ester monomer is selected from cicatronic acid, mesanoic acid, itanoic acid and fumaric acid.

17. The material of claim 4, wherein the organic solvent in (a) is selected from toluene, xylene, decalin and dioxane.

18. The material of claim 4, wherein the polyamine in (a) is selected from bipyridine (bpy), tris[2-(dimethylamino)ethyl]amine (Me6TREN), tris(2-pyridylmethyl)amine (TPMA), 4,4'-Dinonyl-2,2'-dipyridyl (dNbpy) or N, N, N', N ", N"-pentamethyldiethylenetriamine (PMDETA).

19. The material of claim 4, wherein the evaporation step in (b) is carried out by rotary evaporator, laminar flow, fume hood, supercritical drying or oven with pressure control.

20. The material of claim 4, wherein the evaporation temperature in step (a) is between 40° C. and 120° C.

21. The material of claim 4 or 6, wherein the inert atmosphere is selected from nitrogen, helium, and argon.

22. The material of claim 4, wherein the reaction step in (a) lasts 3 to 48 hours.

23. The material of claim 4, wherein the reaction temperature in (a) is between 50 °C and 100° ° C.

24. The material of claim 4, wherein in step (a) the mixture is dried for 19 to 23 hours at 40° C. to 120° C.

* * * * *